(12) United States Patent
Sumiyoshi et al.

(10) Patent No.: US 10,284,082 B2
(45) Date of Patent: May 7, 2019

(54) POWER SUPPLY CONTROL CIRCUIT

(71) Applicant: DENSO CORPORATION, Kariya, Aichi-pref. (JP)

(72) Inventors: Takahiro Sumiyoshi, Kariya (JP); Manabu Hirauchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/546,512

(22) PCT Filed: Feb. 8, 2016

(86) PCT No.: PCT/JP2016/000637
§ 371 (c)(1),
(2) Date: Jul. 26, 2017

(87) PCT Pub. No.: WO2016/136160
PCT Pub. Date: Sep. 1, 2016

(65) Prior Publication Data
US 2018/0019670 A1  Jan. 18, 2018

(30) Foreign Application Priority Data

Feb. 27, 2015 (JP) .................. 2015-038304

(51) Int. Cl.
*H02M 3/156* (2006.01)
*H02J 1/08* (2006.01)
(Continued)

(52) U.S. Cl.
CPC ............ *H02M 3/156* (2013.01); *B60R 16/03* (2013.01); *B60R 16/033* (2013.01); *H02J 1/08* (2013.01);
(Continued)

(58) Field of Classification Search
CPC ......... G05F 1/00; H02M 3/156; H02M 3/158; H02M 1/088; H02J 1/00; H02J 1/08;
(Continued)

(56) References Cited

U.S. PATENT DOCUMENTS 9,843,319 B2 * 12/2017 Petruzzi ............... H03K 17/082
2007/0114986 A1 * 5/2007 Yoshii .................. H02M 3/156
323/288

(Continued)

FOREIGN PATENT DOCUMENTS

JP    2008059141 A    3/2008
JP    2010029009 A    2/2010

*Primary Examiner* — Fritz M Fleming
*Assistant Examiner* — Jagdeep S Dhillon
(74) *Attorney, Agent, or Firm* — Harness, Dickey & Pierce, P.L.C.

(57) ABSTRACT

A power supply control circuit is connected to and controls a system power supply IC. The system power supply IC has multiple power supply circuits and is capable of outputting multiple power supply voltages. The system power supply IC activates the multiple power supply circuits at one time using a common enable signal. The power supply control circuit includes a gate circuit and a first switch unit. The gate circuit generates the common enable signal based on a control signal and a selection signal. The control signal is output from a control device during a usual operation. The selection signal is a signal that selects one of the multiple power supply circuits which is required to output the power supply voltage. The first switch unit is driven by a power-on signal during system activation, and switches on or off the selection signal input to the gate circuit.

3 Claims, 1 Drawing Sheet

(51) Int. Cl.
*B60R 16/03* (2006.01)
*B60R 16/033* (2006.01)
*H02J 1/10* (2006.01)
*B60L 1/00* (2006.01)
*B60L 3/00* (2006.01)
*H02G 3/00* (2006.01)
*H02J 1/00* (2006.01)

(52) U.S. Cl.
CPC ......... *H02J 1/102* (2013.01); *H02J 2001/008* (2013.01)

(58) Field of Classification Search
CPC ........ B60R 16/033; H04B 1/44; H03K 19/00; H03K 19/0185
USPC ....... 307/9.1, 10.1, 43, 66, 64; 323/286, 288
See application file for complete search history.

(56) References Cited

U.S. PATENT DOCUMENTS

| | | | |
|---|---|---|---|
| 2014/0092656 A1* | 4/2014 | Aiura | H02M 3/07 363/59 |
| 2015/0188407 A1* | 7/2015 | Golder | H02J 1/00 307/31 |
| 2015/0244366 A1* | 8/2015 | Lee | H03K 19/0013 326/80 |
| 2016/0056705 A1* | 2/2016 | Adeeb | H02M 3/156 323/271 |
| 2016/0099743 A1* | 4/2016 | Kolcuoglu | H04B 1/48 455/78 |

* cited by examiner

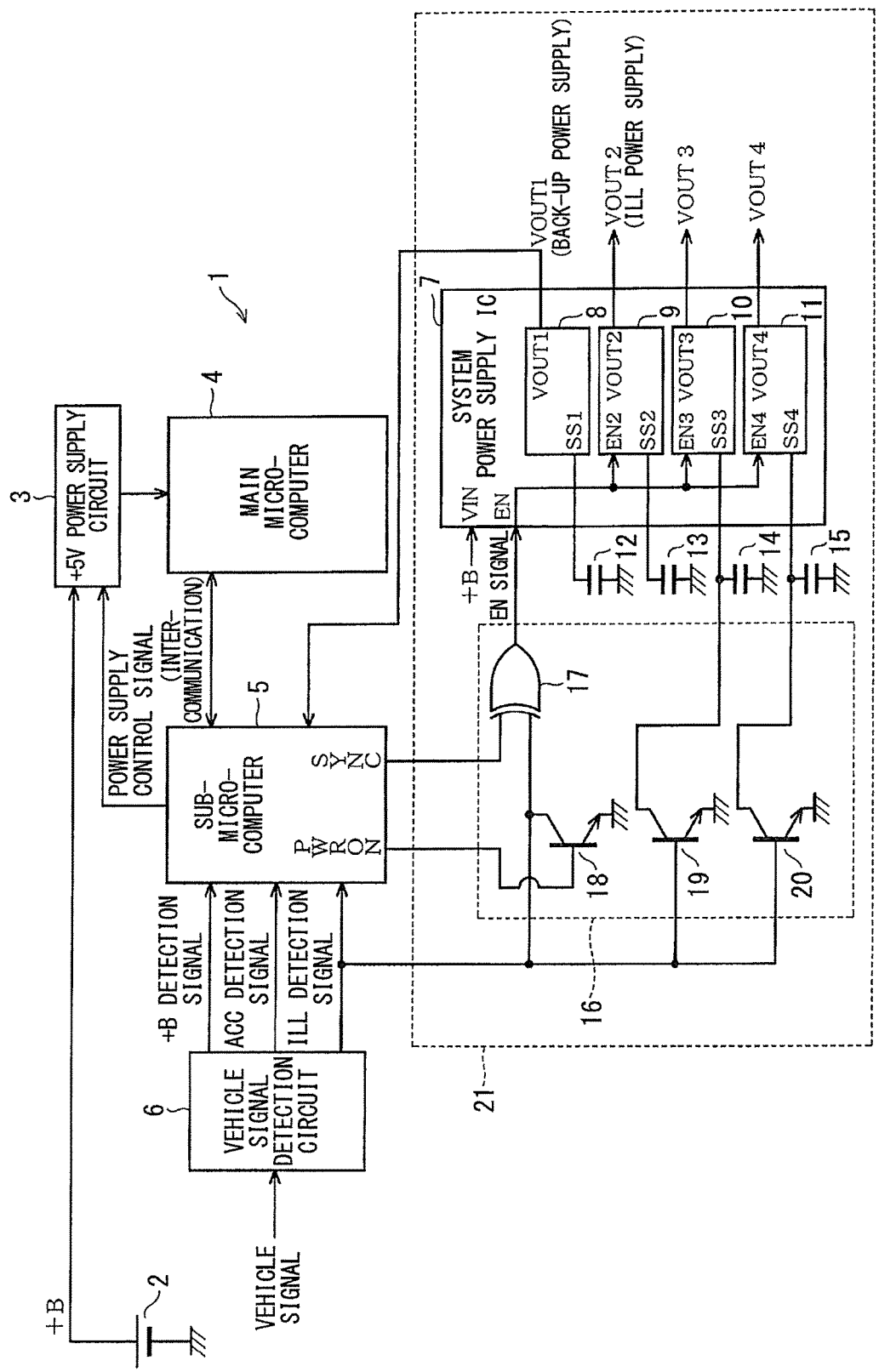

POWER SUPPLY CONTROL CIRCUIT

CROSS REFERENCE TO RELATED APPLICATIONS

This application is a U.S. National Phase Application under 35 U.S.C. 371 of International Application No. PCT/JP2016/000637 filed on Feb. 8, 2016 and published in Japanese as WO 2016/136160 A1 on Sep. 1, 2016. This application is based on and claims the benefit of priority from Japanese Patent Application No. 2015-038304 filed on Feb. 27, 2015. The entire disclosures of all of the above applications are incorporated herein by reference.

TECHNICAL FIELD

The present disclosure relates to a power supply control circuit which controls a system power supply IC capable of outputting multiple power supply voltages.

BACKGROUND ART

Conventionally, a system power supply IC which can output multiple power supply voltages is known (see, e.g., Patent Literature 1). The system power supply IC has multiple built-in power supply circuits in a package. With this configuration, the multiple power supply voltages can be output with a lower cost compared with a case where power supply circuits are individually mounted.

In the above-described kind of system power supply IC, usually, an output of a power supply voltage is controlled by a control device, such as a microcomputer which controls the whole system. In other words, in order to output the power supply voltage from the system power supply IC, the control device should be in operation state.

In a configuration of system, an output of the specific power supply voltage is needed to operate a peripheral device. In some cases, in order to restrict power consumption, the operation of the control device itself is not needed. On the other hand, in a usual operation, a control by the control device needs to be prioritized.

PRIOR ART LITERATURE

Patent Literature

Patent Literature 1: JP 2008-59141 A

SUMMARY OF INVENTION

In view of the foregoing difficulties, it is an object of the present disclosure to provide a power supply control circuit. The power supply control circuit can activate, without a control device, output of power supply voltage from a system power supply IC that is capable of outputting multiple power supply voltages, and in the usual operation, the power supply control circuit can prioritize a control operation performed by the control device.

According to an aspect of the present disclosure, a power supply control circuit is connected to and controls a system power supply IC. The system power supply IC has multiple power supply circuits and is capable of outputting multiple power supply voltages. The system power supply IC activates the multiple power supply circuits at one time using a common enable signal. The power supply control circuit includes a gate circuit and a first switch unit. The gate circuit generates the common enable signal to be transmitted to the system power supply IC based on a control signal and a selection signal. The control signal is output from a control device that controls the system power supply IC during a usual operation. The selection signal is a signal that selects one of the multiple power supply circuits which is required to output the power supply voltage. The first switch unit is driven by a power-on signal during system activation, and the first switch unit switches on or switches off the selection signal input to the gate circuit.

In the above-described power supply control circuit, while no control signal is provided from a control device, the enable signal is output from the gate circuit based on the selection signal. During a system startup, the selection signal is switched off by a first switch unit so that the gate circuit generates the enable signal based on the control signal from the control device. With this configuration, during a system startup, the control signal is prioritized to control the system power supply IC. Thus, the output of power supply voltage can be activated without using the control device in the system power supply IC, and in the usual operation, the power supply control circuit can prioritize the control operation performed by the control device.

BRIEF DESCRIPTION OF DRAWING

The above and other objects, features and advantages of the present invention will become more apparent from the following detailed description made with reference to the accompanying drawing. In the drawing FIGURE a diagram schematically showing an electrical configuration of a power supply control circuit and a vehicle apparatus to which the power supply control circuit is applied.

EMBODIMENT FOR CARRYING OUT INVENTION

Hereinafter, an embodiment of the present disclosure will be described with reference to the drawing.

As shown in FIGURE, a power supply control circuit 16 in the present embodiment is applied to a vehicle apparatus 1 mounted on a vehicle. The vehicle apparatus 1 is an electronic device controlling various functions of the vehicle, and corresponds to, e.g., ECU (Electronic Control Unit). In the present embodiment, the vehicle apparatus 1 supplies various power supply voltages. For example, the vehicle apparatus 1 supplies power (in FIGURE, indicated as VOUT2 (ILL power supply)) to various illumination parts, e.g., a small lamp or the like disposed on the vehicle. Details of power supply will be described below. While the vehicle apparatus 1 is indicated as an example of the electronic device to which the power supply control circuit 16 is applied, the device to which the power supply control circuit 16 is applied is not limited to the vehicle apparatus 1.

The vehicle apparatus 1 operates under a power supply from a battery 2 mounted on the vehicle. Specifically, the power (hereinafter, conveniently referred to as +B, and in FIGURE, also indicated as +B) supplied by the battery 2 is input to a +5V power supply circuit 3 of the vehicle apparatus 1, and +5V power is supplied from the +5V power supply circuit 3 to a main microcomputer 4 (corresponds to a control device) which mainly controls the whole vehicle apparatus 1. When a power supply control signal is input from a sub-microcomputer 5 (corresponds to a control device) which has a power supply management function, the +5V power supply circuit 3 starts supplying the +5V power. Thus, in usual startup of the vehicle apparatus 1, the sub-microcomputer 5 is started, and then the main microcomputer 4 is started. Each of the main microcomputer 4 and the sub-microcomputer 5 includes a CPU, a ROM, a RAM or the like which are not shown in the drawing.

The sub-microcomputer 5 performs an internal power supply control to the vehicle apparatus 1 based on various kinds of detection signals output from a vehicle signal detection circuit 6. In the usual operation, the sub-microcomputer 5 and the main microcomputer 4 communicate with each other so as to monitor operation state of each other.

The vehicle signal detection circuit 6 receives always-on electric power supply from the battery 2, and detects various states of the vehicle based on a vehicle signal which is transmitted from in-vehicle LAN, e.g., CAN (Controller Area Network) or the like. A state of the vehicle includes an ACC state indicating whether an ACC operation is performed, an ILL state indicating whether a lightning operation of the illumination part is performed, or the like. The vehicle signal detection circuit 6 outputs various detection signals, as will be described below, based on a variety of vehicle information, e.g., the ACC state, the ILL state or the like which is transmitted to the vehicle apparatus 1.

+B detection signal: A detection signal which indicates whether the vehicle apparatus is connected to the battery 2. The +B detection signal also indicates whether a voltage (+B) output from the battery 2 is a normal value.

ACC detection signal: A detection signal which indicates a reception of a turn-on command of an accessary power supply.

ILL detection signal: A detection signal which indicates a reception of a turn-on command of the illumination part of the vehicle.

In the vehicle apparatus 1, a system power supply IC 7 is provided to supply the electric power: for driving the main microcomputer 4, the sub-microcomputer 5 or the like; and for supplying the electric power to a peripheral device, such as the above-described illumination part. The system power supply IC 7 includes multiple built-in power supply circuits, such as a power supply circuit 8, a power supply circuit 9, a power supply circuit 10, and a power supply circuit 11. The system power supply IC 7 outputs multiple power supply voltages (VOUT1 to VOUT4). In the present embodiment, each of the power supply circuits 8 to 11 is configured by a DC-to-DC converter, and each of the power supply circuits outputs a predetermined power supply voltage by decreasing or increasing the voltage of +B.

Among the power supply voltages output from the system power supply IC 7, VOUT1 can be supplied independently from other power supply voltages when +B is supplied. The VOUT1 is employed as a back-up power supply of the sub-microcomputer 5. The VOUT2 is employed as the power supply of the above-described illumination part. Each of VOUT3 and VOUT4 is employed as the power supply of another peripheral circuit or another peripheral device. The above-described number and the type of the power supply voltages are showing an example, and the present disclosure is not limited to this example.

In the system power supply IC 7, for the partial power supply circuits 9 to 11 among the whole power supply circuits 8 to 11, the operations are activated together by a common enable signal (in FIGURE, indicated as EN signal). Specifically, in each of the power supply circuits 9 to 11, an enable input (in FIGURE, indicated as EN2 to EN4) is provided. Each of the enable inputs is connected with each other in the system power supply IC 7, and connected to the enable input (in FIGURE, indicated as EN) of the entire system power supply IC 7.

Thus, when the enable signal is input to the system power supply IC 7, the enable signal is also input to each of the power supply circuits 9 to 11. In each of the power supply circuits 9 to 11, when the enable signal is turned on, the operation, i.e., the input of power supply voltage starts. When the enable signal is turned off, the operation is deactivated. As described above, the power supply circuit 8 is configured to independently provide the power supply voltage VOUT1 when the +B signal is supplied. That is, the power supply circuit 8 has no enable input.

In each of the power supply circuits 8 to 11, an adjustment input (in FIGURE, indicated as SS1 to SS4) is provided to adjust a rise time (an output time point of the power supply voltage) of the output of the power supply voltage. When a signal level of the adjustment input becomes an H level (turn on), a specific voltage will be output. The respective adjustment inputs are connected to capacitors 12 to 15. As publicly known, a duration for which each of capacitors finishes charging differs based on a capacity of the capacitor. Thus, by connecting the capacitor to the adjustment input, the duration necessary for the adjustment input to increase to the H level, i.e., the duration from activation of the power supply circuit to actual output of the power supply voltage can be adjusted.

Usually, the rise time of each of the power supply voltages is adjusted to different from one another for preventing generation of excess rush current or overshoot during startup. This control is known as a soft start (soft start). When the capacitor is not connected, each of the power supply circuits outputs the power supply voltage at a specific rise time.

During the usual operation, an activation of the power supply voltage output from the system power supply IC 7 is controlled by a control signal (in FIGURE, indicated as SYNC signal) which is output from the control device (sub-microcomputer 5 in the present embodiment).

When the electric power needs to be supplied to only a specific peripheral device, it is considered that the output of one power supply voltage may be enough. For example, in the vehicle apparatus 1 of the present embodiment, when the illumination part needs to be turned on during parking of the vehicle, the VOUT2 is needed, but the operation of the main microcomputer 4 and the output of VOUT3 or VOUT4 are not needed. During parking or the like which does not need the operation of the control device, each of the main microcomputer 4 and the sub-microcomputer 5 is usually maintained in a low power consumption state, e.g., a deactivated state, a sleep state.

In the above-described case, when the enable signal is configured to output from the control device (sub-microcomputer 5 in the present embodiment), the control device needs to be operated to output the power supply voltage. In addition, because the common enable signal is used in the system power supply IC 7, when only a specific power supply voltage is needed, all of the power supply voltages are output and the power consumption rises. When a power supply IC providing multiple enable signals to control respective power supply circuits 8 to 11 individually is employed, or multiple power supply ICs each of which has single output are employed, cost of the circuit may be significantly increased.

In the present embodiment, the power supply control circuit is applied to the vehicle apparatus 1, and the electric power is provided from the battery 2. In this configuration, when the illumination part needs to be turned on during parking or the like while the charge of the battery 2 is not performed, it is desirable that power consumption of the battery 2 is suppressed by suppressing power consumption of other peripheral devices. In order to suppress power consumption of other peripheral devices, other peripheral devices need to be maintained in deactivated state.

In a power supply circuit portion 21 of the present embodiment, the power supply control circuit 16 is provided to control the system power supply IC 7. With the power supply control circuit 16, the power supply voltage output can be activated without using the control device, such as the sub-microcomputer 5, and in the usual operation, the control operation performed by the control device, such as the sub-microcomputer 5 can be prioritized. In the present embodiment, the power supply voltage which does not need to be output can be controlled in the system power supply IC 7 although the common enable signal is used in the system power supply IC 7.

Hereinafter, the detail of the power supply control circuit 16 will be described. In the following example, suppose that the power supply voltage which needs to be output is VOUT2 (the ILL power supply) and the ILL detection signal is set as a selection signal selecting the power supply circuit 9 which outputs VOUT2.

First, the output activation of the power supply voltage will be described.

The power supply control circuit 16 in the present embodiment receives the control signal (SYNC signal) output from the sub-microcomputer 5 and the ILL detection signal output from the vehicle signal detection circuit 6. The power supply control circuit 16 includes an EXOR gate 17 (corresponding to a gate circuit) whose output side is connected to the enable input of the system power supply IC 7 and a transistor 18 (corresponding to a first switch unit). The transistor is connected to the EXOR gate 17 on the ILL detection signal side.

The EXOR gate 17 outputs, as the enable signal (the EN signal), an exclusive or of the control signal (the SYNC signal, the signal for controlling the system power supply IC 7 in the usual operation state) output from the sub-microcomputer 5 and the ILL detection signal. When either one of the two signals turns on (becomes the H level), the enable signal (the EN signal) also turns on. With this configuration, even when the sub-microcomputer 5 does not work and does not output the SYNC signal (the state that the SYNC signal is an L level), the enable signal turns on in response to an output (turn-on) of the ILL signal.

The transistor 18 interrupts or connects a path between an input terminal of the ILL detection signal of the EXOR gate 17 and ground potential. The transistor 18 is driven by a power on signal (in FIGURE, indicated as PWRON signal) output for starting the system. Specifically, when the power on signal switches to the H level (turns on), the transistor 18 is turned on and the ILL detection signal is forced to decrease to ground potential (the L level). With this configuration, in a system startup in which the vehicle apparatus 1 is started in a usual process, the ILL detection signal of the EXOR gate 17 switches to the L level, and the EXOR gate 17 generates the enable signal based on the SYNC signal. Thus, during the startup of the system, the SYNC signal is prioritized to activate the system power supply IC 7.

With the above-described configuration, the operation of each of the power supply circuits 9 to 11 of the system power supply IC 7 can be activated without activation of the sub-microcomputer 5. Further, during the startup of the system, control of the system power supply IC by the control device can be performed at a higher priority.

Subsequently, the output restriction of the power supply voltage which does not need to be output will be described.

The power supply control circuit 16 includes a transistor 19 and a transistor 20 (corresponding to second switch unit) which interrupt or connect respective paths between adjustment inputs (SS3, SS4) of the power supply circuits 10, 11 and grand potential. In the present embodiment, as described above, VOUT2 is set as the power supply voltage needs to be output. When only VOUT 2 needs to be output, VOUT3 and VOUT4 are the power supply voltages which do not need to be output. Thus, the second switch unit is connected to the adjustment input (SS3, SS4) of the power supply circuit 10, 11.

In the transistor 19, a common contact of the adjustment input (SS3) and the capacitor is connected to a collector terminal, and grand potential is connected to an emitter terminal. In the transistor 20, a common contact of the adjustment input (SS4) and the capacitor is connected to a collector terminal, and grand potential is connected to an emitter terminal. The ILL detection signal is input to a base terminal of each transistor.

Each of the transistors 19, 20 turns off when the ILL detection signal is not output from the vehicle signal detection circuit 6. That is, each of the transistors 19, 20 turns off when the ILL detection signal switches to the L level. The signal level of each of the adjustment inputs (SS3, SS4) reaches the H level after an elapse of delay time corresponding to the capacity of each of the capacitor 14, 15. Then, the power supply circuits 10, 11 output respective specific power supply voltages when the signal levels of the respective adjustment inputs (SS3, SS4) reach the H levels. A state in which signal level of the adjustment input reaches the H level corresponds to a state in which the adjustment input is turned on.

The transistors 19, 20 turn on when the ILL detection signal is output from the vehicle signal detection circuit 6, i.e., when the ILL detection signal switches to the H level. At this time, the signal level of each of the adjustment inputs (SS3, SS4) switches to grand potential (the L level). A state in which the signal level of the adjustment input switches to grand potential corresponds to a state in which the adjustment input is turned off.

During each of the transistors 19, 20 is in turn-on state, the adjustment input (SS3, SS4) is in off state. Thus, the rise time of the power supply voltage output is actually delayed. With this configuration, while the ILL detection signal maintains the H level, VOUT3 and VOUT4 are not output. That is, by controlling the second switch unit to turn on or off the adjustment input based on the selection signal (the ILL detection signal), the output of the corresponding power supply voltage can be controlled.

The ILL detection signal is the signal directly output from the vehicle signal detection circuit 6 without through the sub-microcomputer 5. With this configuration, when driving the transistor 19 or 20, the operation of the sub-microcomputer 5 is not necessary. So, extra electric consumption can be reduced.

Each of the transistors 19, 20 is driven by the ILL detection signal. With this configuration, during the system startup, since the ILL detection signal switches to the L level, each of the transistors 19, 20 is maintained in off state. So, the power supply circuits 10, 11 corresponding to VOUT3 and VOUT4 output the power supply voltages in accordance with rise times defined by the capacities of the capacitors 14, 15, respectively. That is, while the output is restricted by the ILL detection signal, the restriction may be removed during the system startup, and the system power supply IC 7 can be controlled based on the control signal.

The power supply control circuit 16 can directly activate the system power supply IC 7 without using the control device. In the system power supply IC 7 adopting common enable signal, output of the power supply voltage, which does not need to be output, can be restricted. Further, during the usual system startup, the control signal from the control device can be prioritized.

The above-described power supply control circuit 16 provides the following advantages.

The power supply control circuit 16 has the multiple built-in power supply circuits and is connected to the system power supply IC 7. The system power supply IC activates the multiple power supply circuits 8 to 11 at one time using the common enable signal (the EN signal). The power supply control circuit 16 includes the EXOR gate 17 (the gate circuit) and the transistor 18 (the first switch unit). The EXOR gate 17 generates the common enable signal based on a control signal and a selection signal. The control signal (the SYNC signal) is output from the sub-microcomputer 5 (the control device). The selection signal (the ILL detection signal) is the signal that selects one or more of the multiple power supply circuits 8 to 11 which is required to output the power supply voltage (in the present embodiment, power supply circuits 10, 11).

With the above-described configuration, while no control signal is provided from the control device, the enable signal can be output from the EXOR gate 17 based on the selection signal. As a result, the system power supply IC 7 can be activated. That is, the power supply control circuit 16 enables output of the power supply voltage from the system power supply IC 7 without the activation of the control device.

During the system startup, the selection signal is turned off by the transistor 18 so that the EXOR gate 17 generates the enable signal based on the control signal from the control device. In other words, during the system startup, the power supply control circuit 16 generates the enable signal based on the control signal from the control device with the ILL detection signal being invalidated. With this configuration, during the system startup, the system power supply IC 7 can be controlled at a higher priority by the control signal.

As a result, the system power supply IC may employ an IC which operates using the common enable signal, and a significant increase of a cost can be restricted. The power supply control circuit 16 can be realized with a simple circuit configuration employing a relatively low-cost circuit parts, such as the EXOR gate 17 and the transistor 18 so that the increase of the cost for configuring the power supply control circuit 16 can be restricted.

The power supply control circuit 16 includes the transistor (the second switch unit corresponding to the transistor 19, 20 in the present embodiment) driven by the selection signal and switching on or off the adjustment input. The system power supply IC 7 is capable of adjusting an output time point of the power supply voltage via each of the power supply circuits 8 to 11 individually, and the adjustment is performed via the signal level of each of the adjustment inputs (SS1 to SS4) provided in each of the power supply circuits 8 to 11. With this configuration, an output time point of each power supply voltage can be delayed by turning off the corresponding adjustment input. That is, switching on/off the adjustment input can control the output/non-output of the power supply voltage. Because the transistor 19 or 20 is driven by the selection signal, when the selection signal turns on, the adjustment signal corresponding to the power supply voltage which is not selected is turned off. That is, the power supply voltage which does not need to be output is deactivated.

The power supply control circuit 16 is applied to the vehicle apparatus 1 that receives electric power from the battery 2 mounted on the vehicle. With this configuration, the vehicle apparatus 1 is supplied with the electric power from the battery 2, and consumes the battery 2 under operation of the power supply control circuit 16. So, it is desirable to reduce the unnecessary power consumption as much as possible. The unnecessary power consumption includes not only the inside power consumption of the system power supply IC 7 but also the electric power consumed by the peripheral circuits or the like connected to the system power supply IC 7.

The power supply control circuit 16 in the present embodiment, by restricting output of the power supply voltage which does not need to be output, can reduce the power consumption of both the system power supply IC 7 and the peripheral circuits to which VOUT3 or VOUT4 are supplied. In the situation to turn on the illumination part during parking as exemplified in the present embodiment, the charging of the battery 2 is not performed. Thus, it is considered that a reduction effect of the power consumption by the power supply control circuit 16 is more effective in this situation.

The present disclosure is not limited to the embodiment described above and can be properly modified and expanded within the spirit and scope of the present disclosure.

In the above embodiment, an example is indicated that VOUT2 (the ILL power supply) is set as the power supply voltage which needs to be output and the second switch unit is not provided to the power supply circuit which outputs VOUT2. The disclosure is not limited to this configuration, and modification can be made.

In the above embodiment, an example is indicated that only one power supply voltage needs to be output. Alternatively, multiple power supply voltages may need to be output. In the above embodiment, the power supply voltage which needs to be output is previously set. Alternatively, multiple selection signals may be output corresponding to the types of the power supply voltages, and a selection circuit may be arranged to switch the second switch unit based on various combinations of the multiple types of power supply voltages.

The first or second switch unit may be configured by a device other than the transistor. For example, the switch unit may employ a semiconductor switching element such as IGBT (Insulted Gate Bipolar Transistor), and may employ a relay having a contact.

The gate circuit is configured by the EXOR gate 17. Alternatively, another logic circuit may be employed as the gate circuit to obtain the same output.

In the above embodiment, the example of the system includes two control devices. That is, the main microcomputer 4 and the sub-microcomputer 5. Alternatively, the number of the control devices may be one or equal to or more than three.

In FIGURE, reference symbol 1 indicates the vehicle apparatus, reference symbol 2 indicates the battery, reference symbol 4 indicates the main microcomputer (control device), reference symbol 5 indicates the sub-microcomputer (control device), reference symbol 7 indicates the system power supply IC, reference symbols 8, 9, 10 and 11 indicate the power supply circuits, reference symbol 16 indicates the power supply control circuit, reference symbol 17 indicates the EXOR gate (gate circuit), reference symbol 18 indicates the transistor (the first switch unit), and reference symbols 19 and 20 indicate the transistors (the second switch unit).

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A power supply control circuit connected to and controlling a system power supply IC, the system power supply IC having a plurality of power supply circuits and being capable of outputting a plurality of power supply voltages, and the system power supply IC activating the plurality of power supply circuits at one time using a common enable signal, the power supply control circuit comprising:
a gate circuit generating the common enable signal to be transmitted to the system power supply IC based on a control signal and a selection signal, wherein the control signal is output from a control device that controls the system power supply IC during a usual operation, and the selection signal is a signal that selects one of the plurality of power supply circuits which is required to output the power supply voltage; and
a first switch unit driven by a power-on signal during a system activation, wherein the first switch unit switches on or switches off the selection signal input to the gate circuit and the first switch unit is provided by a bipolar junction transistor.

2. The power supply control circuit according to claim 1, wherein
each of the plurality of power supply circuits includes an adjustment input, the system power supply IC is capable of individually adjusting an output time point of the power supply voltage of each of the plurality of power supply circuits based on a signal level of the corresponding adjustment input,
the power supply control circuit further comprises a second switch unit driven by the selection signal, and the second switch unit switches on or switches off each of the adjustment inputs.

3. The power supply control circuit according to claim 1, wherein
the power supply control circuit is applied to a vehicle apparatus which receives electric power from a battery mounted on a vehicle.

* * * * *